(12) United States Patent
Kanugovi et al.

(10) Patent No.: US 9,806,905 B2
(45) Date of Patent: Oct. 31, 2017

(54) WIFI BOOST WITH UPLINK OFFLOAD TO LTE WITH INDEPENDENT IP ADDRESSES

(71) Applicants: Satish Kanugovi, Bangalore (IN); Subramanian Vasudevan, Morristown, NJ (US); Michael Scharf, Stuttgart (DE)

(72) Inventors: Satish Kanugovi, Bangalore (IN); Subramanian Vasudevan, Morristown, NJ (US); Michael Scharf, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 167 days.

(21) Appl. No.: 14/569,726

(22) Filed: Dec. 14, 2014

(65) Prior Publication Data

US 2016/0173297 A1 Jun. 16, 2016

(51) Int. Cl.

| H04W 36/22 | (2009.01) |
|---|---|
| H04L 12/46 | (2006.01) |
| H04W 40/20 | (2009.01) |
| H04W 28/02 | (2009.01) |
| H04W 76/02 | (2009.01) |
| H04W 40/02 | (2009.01) |

(Continued)

(52) U.S. Cl.
CPC ..... *H04L 12/4633* (2013.01); *H04W 28/0226* (2013.01); *H04W 40/02* (2013.01); *H04W 40/20* (2013.01); *H04W 76/022* (2013.01); *H04L 45/72* (2013.01); *H04W 84/12* (2013.01); *H04W 88/06* (2013.01)

(58) Field of Classification Search
CPC .... H04L 12/4633; H04L 45/72; H04W 40/02; H04W 40/20; H04W 28/0226; H04W 76/022; H04W 88/06; H04W 84/12
See application file for complete search history.

(56) References Cited

U.S. PATENT DOCUMENTS 9,392,519 B2 * 7/2016 Zhu ................. H04W 36/22
2008/0130637 A1 6/2008 Kant et al.
(Continued)

FOREIGN PATENT DOCUMENTS

EP 2811779 A1 12/2014
WO WO-2014047939 A1 4/2014

OTHER PUBLICATIONS

International Search Report and Written Opinion of the International Searching Authority dated Mar. 2, 2016, in PCT Application No. PCT/IB2015/002260.

(Continued)

*Primary Examiner* — Phuc Tran
(74) *Attorney, Agent, or Firm* — Harness, Dickey & Pierce, P.L.C.

(57) ABSTRACT

A local gateway and router device is configured to route uplink IP packets from a base station to a network element of a wireless local area network (WLAN) by configuring an IP route for the uplink IP packets based on a source IP address of the uplink IP packets. The source IP address is obtained from the WLAN; the uplink IP packets originate from a user equipment application having the source IP address; and the uplink IP packets have an indicator indicating that the uplink IP packets were received at the base station over a cellular link between the user equipment and the base station.

8 Claims, 5 Drawing Sheets

(51) Int. Cl.
*H04W 84/12* (2009.01)
*H04W 88/06* (2009.01)
*H04L 12/721* (2013.01)

(56) References Cited

U.S. PATENT DOCUMENTS

| | | | | |
|---|---|---|---|---|
| 2013/0003697 | A1* | 1/2013 | Adjakple | H04W 36/0011 370/331 |
| 2014/0078906 | A1 | 3/2014 | Chen et al. | |
| 2014/0079022 | A1 | 3/2014 | Wang et al. | |
| 2014/0082697 | A1 | 3/2014 | Watfa et al. | |
| 2014/0133298 | A1 | 5/2014 | Han et al. | |
| 2014/0341182 | A1* | 11/2014 | Gage | H04W 12/04 370/331 |
| 2015/0029956 | A1* | 1/2015 | Moses | H04W 76/02 370/329 |
| 2015/0029973 | A1* | 1/2015 | Vesterinen | H04W 88/06 370/329 |
| 2015/0049707 | A1 | 2/2015 | Vajapeyam et al. | |
| 2015/0139184 | A1* | 5/2015 | Wang | H04W 28/08 370/331 |
| 2015/0208310 | A1 | 7/2015 | Taneja et al. | |
| 2016/0044567 | A1* | 2/2016 | Baghel | H04W 28/08 370/331 |
| 2016/0088542 | A1 | 3/2016 | Belghoul et al. | |
| 2016/0095037 | A1 | 3/2016 | Morita | |
| 2016/0119939 | A1* | 4/2016 | Himayat | H04W 28/0278 370/329 |
| 2016/0128110 | A1 | 5/2016 | Sirotkin et al. | |
| 2016/0192266 | A1* | 6/2016 | Dai | H04W 28/08 370/331 |
| 2016/0269355 | A1* | 9/2016 | Lee | H04W 8/26 |
| 2016/0277974 | A1* | 9/2016 | Persson | H04W 48/16 |

OTHER PUBLICATIONS

Ling et al., "Enhanced Capacity & Coverage by Wi-Fi LTE Integration", <http://arxiv.org/ftp/arxiv/papers/1406/1406.3147>, pp. 1-6, Jun. 12, 2014.

Kyocera Corp., "Multi-RAT Joint Coordination Involving WLAN", R3-140758, 3rd Generation Partnership Project, vol. RAN WG3, <http://www.3gpp.org/ftp/meetings_3gpp_sync/ran3/docs>, Mar. 30, 2014.

Broadcom Corporation, "WLAN—3GPP Interworking, Assumptions and Impact on Terminal and Core Network", 3rd Generation Partnership Project ,vol. SA WG2, <http://www.3gpp.org/ftp/meetings_3gpp_sync/sa2/docs>, Mar. 23, 2014.

International Search Report and Written Opinion of the International Searching Authority dated Mar. 2, 2016, in PCT Application No. PCT/IB2015/002262.

Office Action from corresponding U.S. Appl. No. 14/569,091, dated May 5, 2017.

U.S. Appl. No. 14/569,091, filed Dec. 12, 2014.

* cited by examiner

WIFI BOOST WITH UPLINK OFFLOAD TO LTE WITH INDEPENDENT IP ADDRESSES

BACKGROUND

In general, cellular systems using licensed spectrum (e.g., $3^{rd}$ Generation Partnership Project (3GPP) Long Term Evolution (LTE) systems) and wireless local area networks (WLANs) using unlicensed bands of spectrum (e.g., Wireless Fidelity (WiFi) or other local access) are used for providing wireless services in a complementary manner. Cellular systems generally provide macro cellular coverage outdoors and with some in-building reach, whereas WLANs generally serve enterprises, residences, public venues, and the like.

SUMMARY

WiFi Boost is a family of schemes for integration of WiFi and cellular (e.g., $3^{rd}$ Generation Partnership Project (3GPP) Long-Term Evolution (LTE)) radio accesses that increases WiFi capacity and coverage by offloading uplink transmissions to cellular links and downlink transmissions to WiFi links. At least some example embodiments do not require changes to WiFi infrastructure and piggyback on existing WiFi standards and deployment.

At least some example embodiments of LTE-WiFi integration may provide additional capacity of WiFi to LTE, and may also enhance WiFi performance and/or application experience. At least some example embodiments may also ensure predictable and controlled WiFi performance.

Example embodiments may be described in the context of, for example, LTE and WiFi integration. However, example embodiments may be extended to systems in which WiFi (or other contention-based wireless technology) is integrated with LTE or other data transport technologies such as Wideband Code Division Multiple Access (WCDMA), High Speed Packet Access (HSPA), Code Division Multiple Access (CDMA), Evolution-data optimized (EVDO) radio access technology, high-speed downlink packet access (HSPDA), HSPDA+, worldwide interoperability for microwave access (WiMAX), etc.

According to at least some example embodiments, the aggregation of the LTE and WiFi systems is accomplished in the scenario where the LTE and WiFi interfaces have separate IP anchors (separate IP paths/addresses). This deployment is exemplified in a scenario in which a home wireless local area network (WLAN) router connects to an Internet Service Provider (ISP) and provides data connectivity over a first IP address (IP1) and one or more LTE femto cells connect to the mobile packet core network and provides data connectivity over a second IP address (IP2). Of course, each of the LTE and WiFi radio access network may provide more than one IP address to the same device. Additionally, both LTE and WiFi radio access networks may connect to the same core network, but obtain separate IP addresses.

At least one example embodiment provides a radio access network element including a local gateway and router device configured to route uplink IP packets from a base station to a network element of a wireless local area network (WLAN) by configuring an IP route for the uplink IP packets based on a source IP address of the uplink IP packets. In at least this example embodiment, the source IP address is obtained from the WLAN; the uplink IP packets originate from a user equipment application having the source IP address; and the uplink IP packets have an indicator indicating that the uplink IP packets were received at the base station over a cellular link between the user equipment and the base station.

At least one other example embodiment provides a user equipment including: a cellular interface and a connection manager processor. The cellular interface is configured to transmit a first flow of uplink Internet Protocol (IP) packets and a second flow of uplink IP packets to a radio access network element over a cellular link, the first flow of uplink IP packets originating from a first application having a first source IP address, and the second flow of uplink IP packets originating from a second application having a second source IP address, the first source IP address being obtained from a cellular IP network and the second IP source address being obtained from a wireless local area network (WLAN). The connection manager processor is configured to offload uplink traffic from a WLAN link, between the user equipment and a WLAN access point, to the cellular link by directing the second flow of uplink IP packets from the second application to the cellular interface for transmission to the radio access network element over the cellular link.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
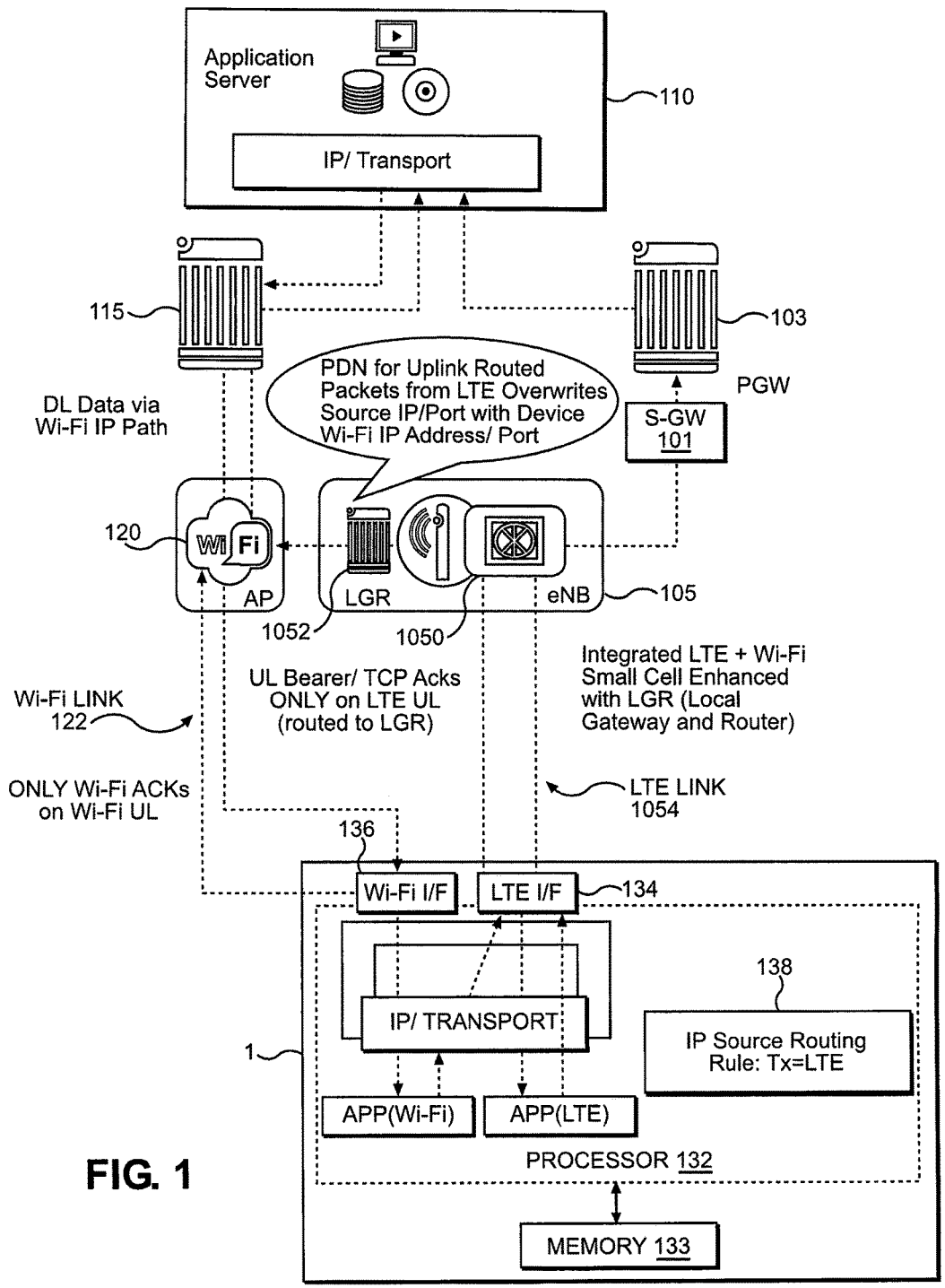
FIG. 1 illustrates an example embodiment of a communication system having integrated cellular and WiFi systems.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing small wireless cells, base stations, NodeBs, gateways, servers, wireless or wireless local area network (WLAN) access points, WiFi access points, wireless or WiFi routers, WLAN gateways, WiFi gateways, local gateway and routers (LGRs), user equipments (UEs) including dual-mode UEs, etc. Such existing hardware may include one or more Central Processing Units (CPUs), system-on-chip (SOC) devices, digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), etc., and describes a transceiver in communication with and providing wireless resources to users in a geographical coverage area. As discussed herein, eNBs may have all functionally associated with conventional, well-known base stations in addition to the capability and functionality discussed herein.

As used herein, the term "small wireless cell" may be considered synonymous to, and may hereafter be occasionally referred to as a micro cell, pico cell, Home NodeB (HNB), Home eNodeB (HeNB), etc., and describes a transceiver in communication with and providing wireless resources (e.g., one or more of 3GPP LTE, 3G, WiFi, etc.) to users in a geographical coverage area that is, in most cases, smaller than the geographical coverage area covered by the eNodeB and a macro cell. As discussed herein, small wireless cells may have all functionally associated with conventional, well-known base stations in addition to the capability and functionality discussed herein. In this regard, the small wireless cells may include a base station, eNB or eNB module. Small wireless cells according to at least some example embodiments may also serve as WLAN (or WiFi) access points (APs) providing WLAN (or WiFi) resources for devices within range of the small wireless cell. Small wireless cells may also include a local gateway and router (LGR). Small wireless cells according to example embodiments will be discussed in more detail later.

The term "user equipment" or "UE" as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a 3GPP LTE network) and/or a WLAN (e.g., WiFi network). The UEs discussed herein may also be referred to as multi-mode UEs capable of communicating over LTE and WiFi.

As discussed herein, a WLAN access point (e.g., a WiFi access point (AP)) may be considered synonymous to, and may hereinafter be occasionally referred to as a wireless access point, wireless router, wireless local area network (WLAN) access point, etc., and describes a transceiver in communication with, and providing WLAN (e.g., WiFi) resources for client devices in range of, and attached to, the WLAN AP. The WLAN AP allows wireless client devices (e.g., electronic devices having a WLAN, e.g., WiFi, transceiver) to connect to other (e.g., wireless and/or wired) networks, such as the Internet.

Generally, as discussed herein, a WLAN AP may be any well-known wireless access point, router, or other physical computer hardware system, including one or more processors, various communication interfaces (e.g., both wireless and wired), a computer readable medium, etc. The one or more interfaces may be configured to transmit/receive data signals via a wireless connection over a WLAN to/from one or more other devices, and also communicate with the Internet, for example over a wired connection.

Generally, as discussed herein, a small wireless cell may be any well-known small wireless cell including one or more processors, various communication interfaces (e.g., LTE, WiFi and wired), a computer readable medium, memories, etc. The one or more interfaces may be configured to transmit/receive data signals via wireless connections over a WiFi and a cellular network to/from one or more other devices, and also communicate with the Internet, for example over a wired connection.

Generally, as discussed herein, a local gateway and router (LGR) device may be any well-known gateway and/or router device including one or more processors, various communication interfaces (e.g., TCP/IP, wired, wireless, etc.), a computer readable medium, memories, etc. The one or more interfaces may be configured to transmit/receive data signals via wired and/or wireless connections over, for example, an IP connection to/from one or more other devices, and also communicate with the Internet.

According to example embodiments, packet data network (PDN) gateways (PGWs), serving gateways (SGWs), UEs, application/proxy servers, small wireless cells, eNBs, WLAN access points (APs), WiFi APs, wireless routers, servers, WLAN gateways, local gateway and routers (LGRs), etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs), computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

According to at least some example embodiments, the aggregation of the LTE and WiFi (or other WLAN systems) is accomplished in the scenario where the LTE and WiFi interfaces have separate IP anchors (separate IP paths/addresses) between an application server and a UE. In one example implementation, a home WLAN router connects to an Internet Service Provider (ISP), and provides data connectivity over a first IP address and one or more LTE femto cells connect to the mobile packet core network (e.g., Evolved Packet Core (EPC) or other cellular IP network) and provides data connectivity over a second IP address. Both LTE and WiFi radio access networks may connect to the same core network, but obtain separate IP addresses.

FIG. 1 illustrates an example embodiment of a communication system having integrated cellular (e.g., LTE) and WLAN (e.g., WiFi) systems.

Example embodiments will be described herein in the context of LTE and WiFi integration. However, example embodiments may be extended to systems in which WiFi (or other contention-based wireless technology) is integrated with LTE or other data transport technologies like Wideband Code Division Multiple Access (WCDMA), High Speed Packet Access (HSPA), Code Division Multiple Access (CDMA), Evolution-data optimized (EVDO) radio access technology, high-speed downlink packet access (HSPDA), HSPDA+, worldwide interoperability for microwave access (WiMAX), etc.

Referring to FIG. 1, the communication system includes an application or proxy server (referred to herein as an application server) 110; a packet data network (PDN) gateway (PGW) 103; a serving gateway (SGW) 101; and a small wireless cell 105.

The application server 110 may be a web server that hosts multimedia content (e.g., voice, video, etc.). In another example, the application server 110 may be a Voice over Internet Protocol (VoIP) server providing VoIP services to users in the network, a web server, an instant messaging server, an email server, a software and/or cloud server, or any other Internet Protocol (IP)-based service deliverable to a mobile or other device using 3GPP access and/or non-3GPP access (e.g., WLAN, WiFi, etc.). In this regard, downlink bearer IP traffic (also referred to herein as downlink bearer traffic, and includes downlink IP packets or IP packet flows) may include a webpage, a video, an email, an instant message, one direction of a VoIP call, one direction of a video call, or the like, which originates at the application server 110, and is sent to the small wireless cell 105 via the Internet. Uplink bearer IP traffic (also referred to herein as uplink bearer traffic, and includes uplink IP packets or IP packet flows) may include a request for a webpage, a request for a video, an email, an instant message, one direction of a VoIP call, one direction of a video call, upload of a video, or the like.

The PGW 103 serves as an interface between an IP Packet Data Network (IP-PDN) and an IP Connectivity Access Network (IP-CAN). The PGW 103 is responsible for IP address allocation for UEs, as well as Quality of Service (QoS) enforcement and flow-based charging according to rules from a Policy Control and Charging Rules Function (PCRF). The PGW 103 is operatively connected to the SGW 101 over the S5/S8 interface. The SGW 101 is also operatively connected to the small wireless cell 105 over the S1-U interface.

The SGW 101 provides a connection between the small wireless cell 105 and the PGW 103 by storing a current one-to-one mapping between Evolved Packet System (EPS) bearers carried over the S1-U interface (between the SGW 101 and the small wireless cell 105) and the S5/S8 interface. The SGW 101 serves as the gateway between the evolved Universal Mobile Telecommunications System (UMTS) Terrestrial Radio Access Network (EUTRAN) and the EPC.

Still referring to FIG. 1, the small wireless cell 105 includes an integrated eNB 1050 (also referred to as a base station or base station module), a local gateway and router (LGR) (also referred to herein as a LGR module) 1052, and a WiFi access point (AP) 120 (also referred to as a WLAN AP or WiFi AP module).

The eNB 1050 provides wireless resources and radio coverage for UEs in the cellular coverage area of the small wireless cell 105. According to one or more example embodiments, the eNB 1050 may provide wideband radio frequency resources (e.g., 3GPP-LTE, and the like), and may be based on either Frequency Division Duplexing (FDD) or Time Division Duplexing (TDD). The eNB 1050 may also be based on scheduled access for user data such that the cellular links between the eNB 1050 are understood to be scheduled, contentionless links (i.e., all downlink and uplink user plane transmissions for UEs via the cellular links are scheduled by the integrated eNB 1050. The eNB 1050 may be configured to communicate using existing procedures for use by wireless cells (e.g., a macro cell, micro cell, pico cell, eNodeB, eNB, HeNB, etc.) to communicate via a LTE air interface.

The LGR 1052 provides the IP anchor for the access point name (APN) used for WiFi uplink IP traffic offloaded from the WiFi link 122 to the LTE link 1054. The LGR 1052 also establishes and maintains an interface (e.g., an internal IP tunnel) with the WiFi AP 120, and forwards the uplink IP packets offloaded from the WiFi link 122 to the LTE link 1054 based on the source IP address of the uplink IP packets, which is the source IP address of the WiFi interface 136 used by the application App(WiFi) at the UE 1, identified and determined to be part of the WLAN subnetwork. The source IP address of the WiFi interface 136 used by the application App(WiFi) at the UE 1 may also be referred to as the source IP address associated with the application App(WiFi). Example operation of the LGR 1052 will be discussed in more detail later.

The WiFi AP 120 provides WiFi resources for UEs in the WiFi coverage area of the small wireless cell 105. As is known, WiFi resources are time-shared channel resources that use a polite access protocol (e.g., Carrier Sense Multiple Access (CSMA)). According to the CSMA mechanism, each potential transmitter, including the WiFi AP 120 and UEs, vie for use of the channel for both uplink and downlink transmissions and defers transmission until the channel is deemed to be clear.

At the small wireless cell 105 shown in FIG. 1, the eNB 1050 is communicatively connected to the LGR 1052, which is further communicatively coupled to the WiFi AP 120 through an IP tunnel.

Still referring to FIG. 1, the UE 1 is a multi-mode user device that supports both LTE-based and WiFi-based communications. For example, the UE 1 may be a smartphone, a tablet computer, a laptop, a personal digital assistant (PDA), or the like. The UE 1 may include: a processor (also referred to herein as a connection manager processor) 132; a memory 133; LTE interface (also referred to herein as a LTE I/F or cellular interface) 134; and WiFi interface (also referred to herein as a WiFi I/F or WLAN interface) 136. The processor 132 is communicatively connected to each of the memory 133, the LTE interface 134, and the WiFi interface 136. The memory 133 stores programs and/or applications (e.g., application App(WiFi) and/or App(LTE)) that may be executed by the processor 132, including those programs/routines/functions that provide functionality of the LTE-WLAN integration capability discussed herein. The memory 133 also stores data usable to provide, or generated as a result of, execution of various functions of the LTE-WLAN integration capability discussed herein. It will be appreciated that the implementation of UE 1 depicted in FIG. 1 is merely an example, and that UE 1 may be implemented in any other manner suitable for providing functions of the LTE-WLAN integration capability. The memory 133 may also store an IP routing table 138, which will be discussed in more detail later.

Still referring to FIG. 1, the UE 1 includes application App(WiFi) and App(LTE). The application App(WiFi) is an application that connects to the application server 110 via a first IP address, which is obtained through the association of the UE 1 with the WiFi AP 120. In this regard, the first IP address may be referred to as being obtained from a WLAN or WiFi network. The application App(WiFi) also receives downlink bearer traffic (also referred to as downlink data) from the application server 110 via the WiFi AP 120 over the WiFi link 122. The UE 1 also sends WiFi acknowledgements (ACKs) and control messages over the WiFi link 122 per the WiFi air interface protocol.

In one example, even when the UE 1 offloads uplink IP packets originating at the application App(WiFi) from the WiFi link 122 to the LTE link 1054, the UE 1 may continue to send the WiFi acknowledgements (ACKs) and control messages over the WiFi link 122. In this regard, the UE 1 may send only the WiFi acknowledgements (ACKs) and control messages on the uplink over the WiFi link 122.

The application App(LTE) is an application that connects to the application server 110 via a second IP address, which is obtained through the association of the UE 1 with the LTE network (also referred to as the cellular network). In this regard, the second IP address may be referred to as being obtained from a cellular IP network. The application App (LTE) also receives downlink bearer IP traffic (also referred to as downlink IP data) from the application server 110 via the eNB 1050 over the LTE link 1054. On the uplink, the application App(LTE) sends uplink IP bearer traffic as well as WiFi bearer acknowledgements (ACKs) and Transport Control Protocol (TCP) ACKs. In at least some example embodiments, the WiFi bearer ACKs and TCP ACKs (e.g., associated with the application App(WiFi)) are sent only on the LTE uplink, not the WiFi uplink. The applications App(WiFi) and App(LTE) may be separate applications, or alternatively, portions of the same application that utilize separate packet flows (or subflows) of packets on one or more of the uplink and downlink.

Still referring to FIG. 1, when the WiFi interface 136 transmits uplink IP packets originating from the application App(WiFi), the IP address assigned by the WiFi network (discussed in more detail below) may be included as the source IP address in the header of the uplink IP packets in the uplink packet flow. Similarly, when the LTE interface 134 transmits uplink IP packets originating from the application App(LTE), the IP address assigned by the LTE network to the UE 1 for the application App(LTE) (discussed in more detail below) may be included as the source IP address in the header of the uplink IP packets of the uplink packet flow. By contrast, when the LTE interface 134 transmits uplink IP packets originating from the application App(WiFi), the IP address assigned by the WiFi network may be used as the source IP address in the header of the uplink IP packets in the uplink IP packet flow. In this case, the LGR 1052 is used as the APN of the uplink IP packet flow originating from the application APP(WiFi), but transmitted by the LTE interface 134 over the LTE link 1054 such that these uplink IP packets can be routed from the eNB 1050 to the WLAN for further transmission through the northbound IP network to, for example, the application server 110. In this case, the eNB 1050 identifies the uplink IP packets originating from the application App(WiFi) based on the APN included in the header of the uplink IP packets. In this regard, the uplink IP packets having the LGR 1052 as the APN are routed to the LGR 1052, and then on to the WiFi AP 120. The APN included in the header of the uplink IP packets may also serve as an indicator indicating that a given uplink IP packet originated from the application App(WiFi), but was received at the eNB 1050 over the LTE link 134 between the UE 1 and the eNB 1050.

As mentioned above, the UE 1 further includes one or more IP routing table(s) 138. The IP routing table(s) 138 are configured such that all uplink IP traffic is routed to the LTE interface 134 (e.g., IP Source Routing Rule Tx=LTE), and transmitted to the eNB 1050 over the LTE link 1054. That is, for example, all uplink IP traffic (including the TCP ACKs) from the application App(WiFi) and the application App(LTE) is routed to the LTE interface 134 and transmitted to the eNB 1050 on the uplink over the LTE link 1054. As discussed in more detail later, the uplink IP traffic originating at the application App(WiFi), but transmitted on the uplink via the LTE interface 134, is then routed back to the WiFi AP 120 by the LGR 1052 for further transmission to the IP core network in the same manner as uplink IP packets transmitted to the WiFi AP 120 over the WiFi link 122. Accordingly, the uplink IP traffic originating at the application App(WiFi), which is connected to the application server 110 via the WiFi IP address, may be offloaded from the WiFi link 122 to the LTE link 1054 thereby improving downlink performance on the WLAN and/or overall capacity of the communications network.

It will be appreciated that the implementation of UE 1 depicted in FIG. 1 is merely an example, and that UE 1 may be implemented in any other manner suitable for providing functions of the LTE-WLAN integration capability.

Figure 2:
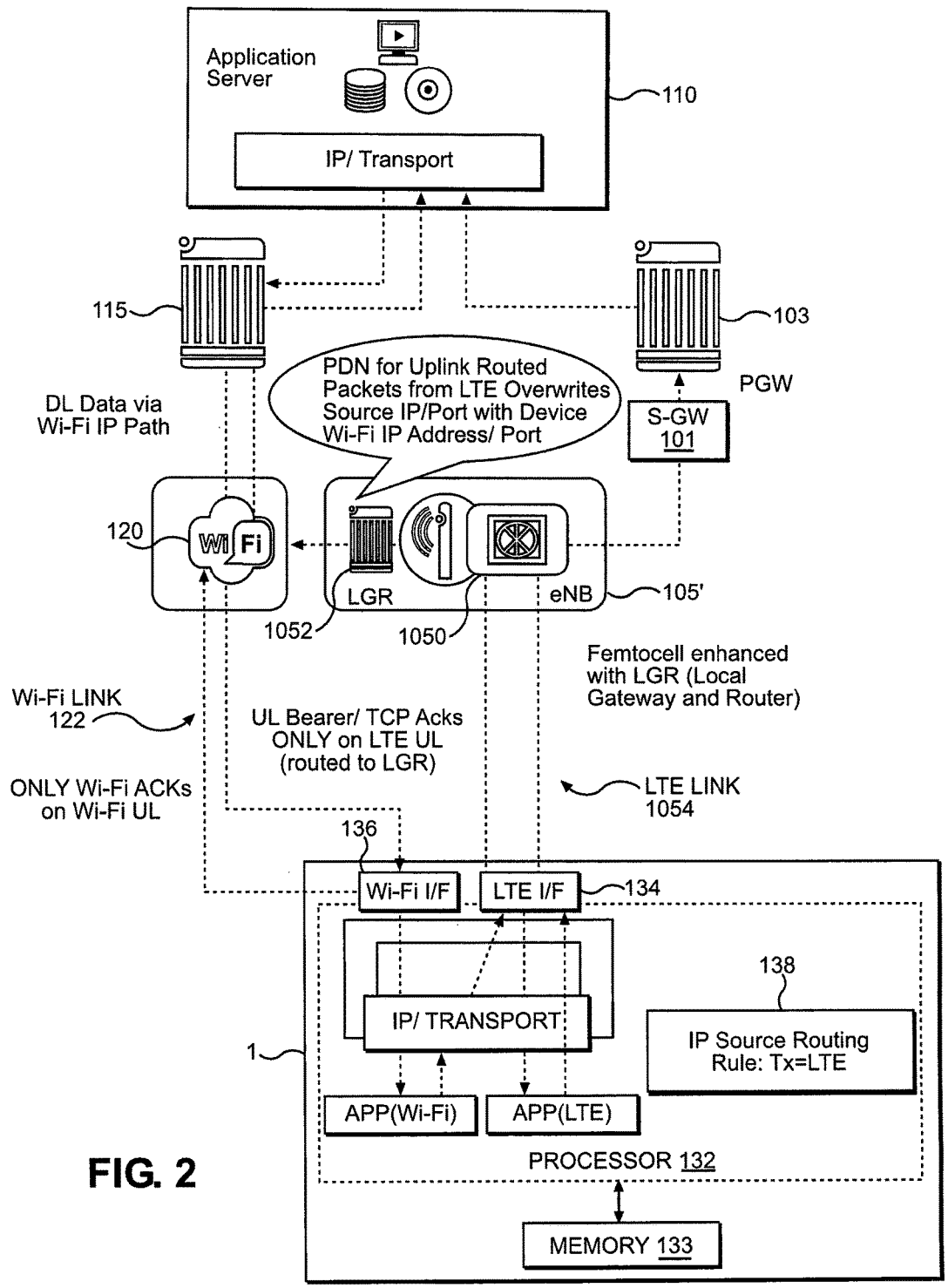
FIG. 2 illustrates another example embodiment of a communication system having integrated cellular and WiFi systems.

FIG. 2 illustrates another example embodiment of a communication system having integrated LTE and WiFi systems. The communication system in FIG. 2 is similar to the communication system shown in FIG. 1, except that the eNB 1050 and the WiFi AP 120 are not co-located at a small wireless cell. Rather, in the example embodiment shown in FIG. 2, the small wireless cell 105' includes the eNB 1050 and the LGR 1052, whereas the WiFi AP 120 is separate from the small wireless cell 105'.

In this example embodiment, the WiFi AP 120 may be a more generic WLAN router (e.g., a WiFi router). According to at least some example embodiments, the WLAN router may be used to provide a backhaul link to the small wireless cell 105'.

Still referring to FIG. 2, the small wireless cell 105' (including the eNB 1050 and/or the LGR 1052) may be communicatively connected to the WiFi AP 120, for example, by an Ethernet connection. The eNB 1050 may establish an IP tunnel to the WiFi AP 120 using a local IP address assigned to the eNB 1050 by the WiFi AP 120.

Figure 3:
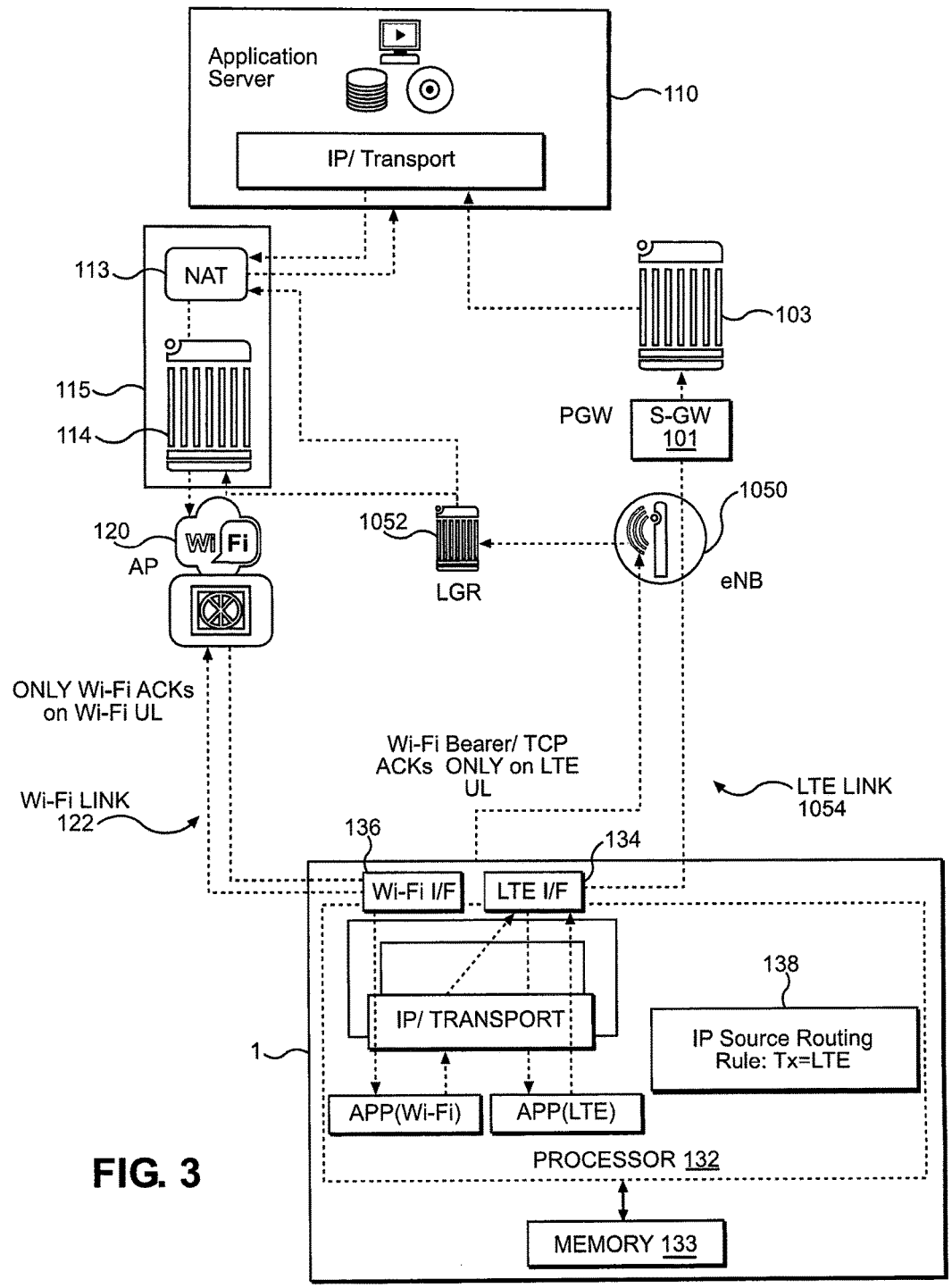
FIG. 3 illustrates yet another example embodiment of a communication system having integrated cellular and WiFi systems.

FIG. 3 illustrates another example embodiment of a communication system having integrated LTE and WiFi systems. The communication system in FIG. 3 is similar to the communication system shown in FIGS. 1 and 2, except that the eNB 1050, the LGR 1052 and the WiFi AP 120 are not co-located at a small wireless cell, but are separate network elements.

In example embodiment shown in FIG. 3, the eNB 1050 (e.g., an indoor small cell, outdoor small cell providing indoor LTE coverage, a macro cell providing indoor coverage, etc.) interfaces with a WLAN GW 115, which controls access to the WiFi AP 120. As shown in FIG. 3, the WLAN GW 115 includes: a gateway router (or other traffic routing device, also referred to herein as a gateway routing function) 114 to route uplink and downlink traffic; and a Network Address Translation (NAT) function 113. As is well-known, a NAT function modifies network address information in IP datagram packet headers while in transit across a traffic routing device (such as the gateway router 114 at the WLAN GW 115) for the purpose of remapping one IP address space to another.

In FIG. 3, the NAT function 113 is co-located with the gateway router 114 at the WLAN GW 115, and the multi-mode UE 1 may not have information regarding the actual public WiFi IP address used to communicate with the application server 110. In at least this example embodiment, the WiFi IP address provided to the UE 1 for the application App(WiFi) is a private/local IP address that is mapped to the public IP address/port combination by the NAT function 113 for forwarding the uplink packets to the northbound IP network. The NAT function 113 also performs the converse function for delivery of downlink packets destined to for WiFi devices (e.g., UE 1) served by the WiFi AP 120, by mapping the public IP to the local IP address assigned to the devices in the local WLAN network (e.g., including the WLAN GW 115 and the WiFi AP 120. Because WLAN GWs, gateway routers and routing functions, and NAT functions such as these are well-known, a detailed discussion is omitted.

Due to the presence of the WLAN GW 115, the LGR 1052 in FIG. 3 does not forward uplink packets to the WiFi AP 120 as discussed above with regard to FIGS. 1 and 2. Rather, the LGR 1052 forwards/routes the offloaded uplink IP packets to the WLAN GW 115. In one example, the LGR 1052 forwards/routes the offloaded uplink IP packets to the gateway router 114 at the WLAN GW 115. In another example, the LGR 1052 forwards/routes the offloaded uplink IP packets more directly to the NAT function 113. In each of these examples, the LGR 1052 interfaces with the WLAN GW 115 (including the routing function 114 and/or NAT function 113) using a generic routing encapsulation (GRE) tunnel, similar to the mechanism used by WiFi APs to connect to a WLAN GW and/or NAT function.

According to at least some example embodiments, the WLAN GW 115 and/or NAT function 113 are configured and managed to allow access by the LGR 1052. In one example, the firewall (not shown) at the WLAN GW 115 and/or NAT 113 may be configured to allow reception of incoming packets from the LGR 1052.

Figure 4:
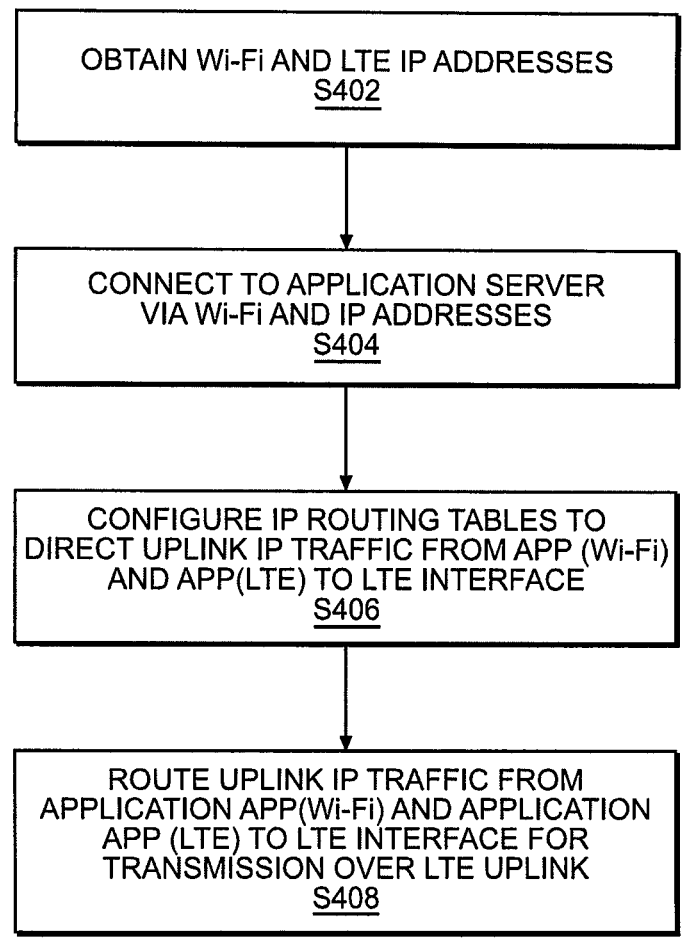
FIG. 4 is a flow chart illustrating an example embodiment of a method for offloading uplink Internet Protocol (IP) traffic to the $3^{rd}$ Generation Partnership Project (3GPP) Long-Term Evolution (LTE) network.

FIG. 4 is a flow chart illustrating an example embodiment of a method for offloading uplink IP traffic (e.g., all uplink IP traffic) from a WiFi link to an LTE link. The method shown in FIG. 4 may be performed at the UE 1 shown in FIGS. 1 through 3.

Referring to FIG. 4, at step S402 the UE 1 obtains a WiFi IP address (e.g., also referred to herein as a first IP address or IP1) for the application App(WiFi) and its corresponding packet flow or subflow, and obtains a LTE IP address (e.g., also referred to herein as a second IP address or IP2) for the application App(LTE) and its corresponding packet flow or subflow.

As discussed above, the UE 1 may obtain the WiFi IP address from the WLAN through the association of the UE 1 with the WiFi AP 120. In one example, as is well-known, the UE 1 obtains the WiFi IP address when the UE 1 establishes a WiFi IP connection between with the WiFi AP 120. This includes, for example: establishing an association with a service set identifier (SSID) at the WiFi AP 120; and performing IP address allocation procedures with the WiFi AP 120 to assign a WiFi IP address for the UE session of the UE 1. Because procedures for obtaining a WiFi IP address for a UE are well-known, further discussion is omitted.

The UE 1 obtains the LTE IP address from the LTE network (also referred to herein as the cellular IP network or cellular network) when the UE 1 establishes a LTE IP connection with the eNB 1050. This includes, for example: establishing an association with the eNB 1050; and performing IP address allocation procedures with the PGW 103 such that the LTE IP address is assigned to the UE 1 for the UE session. Because procedures for obtaining an LTE IP address for a UE are well-known, further discussion is omitted.

After obtaining the WiFi IP address and the LTE IP address, at step S404 the application App(WiFi) at the UE 1 connects to the application server 110 via the WiFi link 122 using the WiFi IP address, and the application App(LTE) connects to the application server 110 via the LTE link 1054 using the LTE IP address. The applications App(WiFi) and App(LTE) may connect to the application server 110 in any well-known manner. Because methods for establishing such connections are well-known, a detailed discussion is omitted.

At step S406, the UE 1 configures the IP routing tables such that uplink IP traffic from the application APP(WiFi) and application App(LTE) are directed to the LTE interface 134 for transmission to the eNB 1050 over the LTE link 1054. In a more specific example, the UE 1 configures the IP routing table(s) 138 such that all uplink IP traffic (including uplink IP traffic from the application APP(WiFi) and application App(LTE)) is directed to the LTE interface 134, and transmitted to the eNB 1050 over the LTE link 1054. According to example embodiments, the UE 1 continues to transmit the WiFi ACKs and Control messages over the WiFi link 122.

As is known, an IP routing table is a data table stored in a networked UE or other IP-enabled device that lists routes to particular network destinations, and in some cases, metrics (distances) associated with those routes. In connection with step S406 in FIG. 4, the UE 1 configures the IP routing table(s) 138 such that the uplink route to the application server 110 passes through the LTE interface 134 and the LTE link 1054 on the uplink independent (or irrespective) of whether the uplink IP traffic originates at the App(WiFi) that is associated with the WiFi IP address, or the App(LTE), which is associated with the LTE IP address. Methods for configuring IP routing tables are well-known, and thus, a detailed discussion of this methodology is omitted.

After the IP routing table(s) 138 are configured at step S406, the UE 1 offloads the uplink IP traffic from the WiFi link 122 to the LTE link 1054 by routing/directing uplink IP traffic from the application App(WiFi) to the LTE interface 134 such that all uplink IP traffic (including uplink IP traffic from the application App(WiFi) and application App(LTE)) is transmitted to the eNB 1050 over the LTE link 1054.

When the uplink IP packets originating from the App (WiFI) at the UE 1 (sometimes referred to herein as WiFi uplink packets or WiFi uplink IP packets), but transmitted over the LTE link 1054, reach the eNB 1050, the WiFi uplink IP packets are forwarded/routed to the WiFi AP 120 for delivery to the application server 110 over the IP core network in the same manner as uplink IP packets transmitted from the WiFi interface 136 to the WiFi AP 120 over the WiFi link 122.

In more detail, upon receipt of the WiFi uplink IP packets over the LTE link 1054, the eNB 1050 forwards the uplink WiFi IP packets to the LGR 1052. According to at least some example embodiments, the UE 1 uses the LGR 1052 as the APN for sending the WiFi uplink IP packets over the LTE link 1054 to the eNB 1050. The eNB 1050 identifies the WiFi uplink IP packets from among the uplink IP packets received over the LTE link 1054 as those uplink IP packets having the LGR 1052 as the APN. In other words, the eNB 1050 identifies the WiFi uplink IP packets from among the uplink IP packets received over the LTE link 1054 based on the LGR APN used to send the WiFi uplink IP packets over the LTE link 1054. As mentioned above, the LGR APN may also serve as an indicator indicating that a given uplink IP packet is a WiFi uplink IP packet originating from the application App(WiFi), but received at the eNB 1050 over the LTE link 134 between the UE 1 and the eNB 1050.

The LGR 1052 forwards/routes the WiFi uplink IP packets from the eNB 1050 to the WLAN (including, e.g., the WiFi AP 120 and the WLAN GW 115) based on the source IP address of the uplink IP packets, which is the source IP address of the WiFi interface 136 used by the application App(WiFi) at the UE 1, identified and determined to be part of the WLAN subnetwork. In at least some example embodiments, the LGR 1052 identifies the IP address to be part of the WLAN subnetwork through, for example, pre-configuration.

The WiFi uplink IP packets received from the LGR 1052 are then forward/routed to the IP core network and delivered to the application server 110 in the same manner as uplink IP packets transmitted to the WLAN by the WiFi interface 136 over the WiFi link 122.

According to example embodiments, the LGR 1052 may route the WiFi uplink IP packets to various elements in the WLAN. Different example implementations will be discussed in more detail below with regard to FIGS. 1 through 3.

With regard to the example embodiments shown in FIGS. 1 and 2, for example, the LGR 1052 forwards/routes the WiFi uplink IP packets to the WiFi AP 120 by based on the source IP address of the uplink IP packets, which is the source IP address of the WiFi interface 136 used by the application App(WiFi) at the UE 1, identified and determined to be part of the WLAN subnetwork. In the example embodiment shown in FIG. 1, the LGR 1052 forwards/routes the WiFi uplink IP packets to the WiFi AP 120 via an IP tunnel (e.g., an internal IP tunnel) within the small wireless cell 105. In the example embodiment shown in FIG.

2, the LGR 1052 forwards/routes the WiFi uplink IP packets to the WiFi AP 120 via an external connection or IP tunnel (e.g., an Ethernet connection that is external to the small wireless cell 105') between the LGR 1052 and the WiFi AP 120, rather than an internal connection within the small wireless cell as in FIG. 1.

In each of the example embodiments shown in FIGS. 1 and 2, the WiFi AP 120 then forwards/routes the WiFi uplink IP packets from the LGR 1052 to the IP core network for delivery to the application server 110 in the same manner as uplink packets received from the WiFi interface 136 over the WiFi link 122.

In the example embodiment shown in FIG. 3, the LGR 1052 forwards/routes the WiFi uplink IP packets to the WLAN GW 115 through, for example, a GRE tunnel, by configuring the IP route based on the source IP address of the uplink IP packets, which is the source IP address of the WiFi interface 136 used by the application App(WiFi) at the UE 1, identified and determined to be part of the WLAN subnetwork. As mentioned above, the GRE tunnel discussed here is similar or substantially similar to the mechanism used by WiFi APs to connect to a WLAN GW and/or NAT function. In this example, the WLAN GW 115 then forwards/routes the WiFi uplink IP packets from the LGR 1052 to the IP core network for deliver to the application server 110 in the same manner as uplink IP packets received at the WiFi AP 120 from the WiFi interface 136 over the WiFi link 122.

In one example with regard to the example embodiment shown in FIG. 3, the LGR 1052 forwards/routes the WiFi uplink IP packets to the gateway router (or gateway routing function) 114 at the WLAN GW 115 through the GRE tunnel. In this example, the gateway router 114 routes the WiFi uplink IP packets to the NAT function 113, which then maps the private/local IP address on the WLAN to a public IP address/port combination for forwarding to the application server 110 over the northbound IP network.

In another example with regard to the example embodiment shown in FIG. 3, the LGR 1052 forwards/routes the WiFi uplink IP packets (e.g., directly) to the NAT function 113 through the GRE tunnel. The NAT function 113 then maps the private/local IP address on the WLAN to a public IP address/port combination for forwarding to the application server 110 over the northbound IP network.

Figure 5:
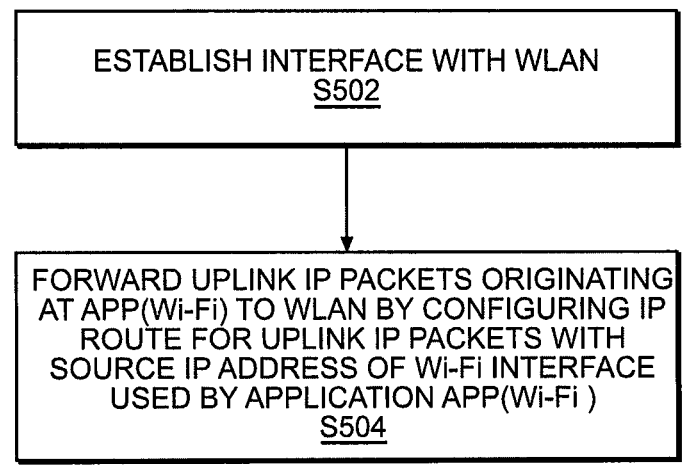
FIG. 5 is a flow chart illustrating an example embodiment of a method for operating a local gateway and router (LGR).

FIG. 5 is a flow chart illustrating example operation of the LGR 1052 shown in FIG. 1. The example embodiment shown in FIG. 5 will be discussed with regard to the communication systems shown in FIGS. 1 through 3.

Referring to FIG. 5, at step S502 the LGR 1052 establishes an interface with the WLAN (including, e.g., the WiFi AP 120 and the WLAN GW 115). As discussed above, the interface between the LGR 1052 and the WLAN may be in the form of an IP tunnel (either internal or external) with the WiFi AP 120, or in the form of a GRE tunnel with the WLAN GW 115 (e.g., the gateway router 114) or more directly with the NAT function 113 at the WLAN GW 115. Because methods for establishing interfaces including IP tunnels and GRE tunnels such as these are well-known, a detailed discussion is omitted.

After the interface with the WLAN has been established, at step S504 the LGR 1052 routes/forwards WiFi uplink IP packets received from the eNB 1050 to the WLAN by configuring the IP route based on the source IP address of the uplink IP packets, which is the source IP address of the WiFi interface 136 used by the application App(WiFi) at the UE 1, identified and determined to be part of the WLAN subnetwork. As discussed above, according to example embodiments, the LGR 1052 may route the WiFi uplink IP packets to various elements in the WLAN. As shown in FIGS. 1 and 2, for example, the LGR 1052 may forward/route the WiFi uplink IP packets to the WiFi AP 120 over an IP tunnel. As shown in FIG. 3, for example, the LGR 1052 may bypass the WiFi AP 120, and forward/route the WiFi uplink IP packets to the WLAN GW 115 through, for example, a GRE tunnel. In this example, the LGR 1052 may route the WiFi uplink IP packets to the gateway router 114 or more directly to the NAT function 113.

Figure 6:
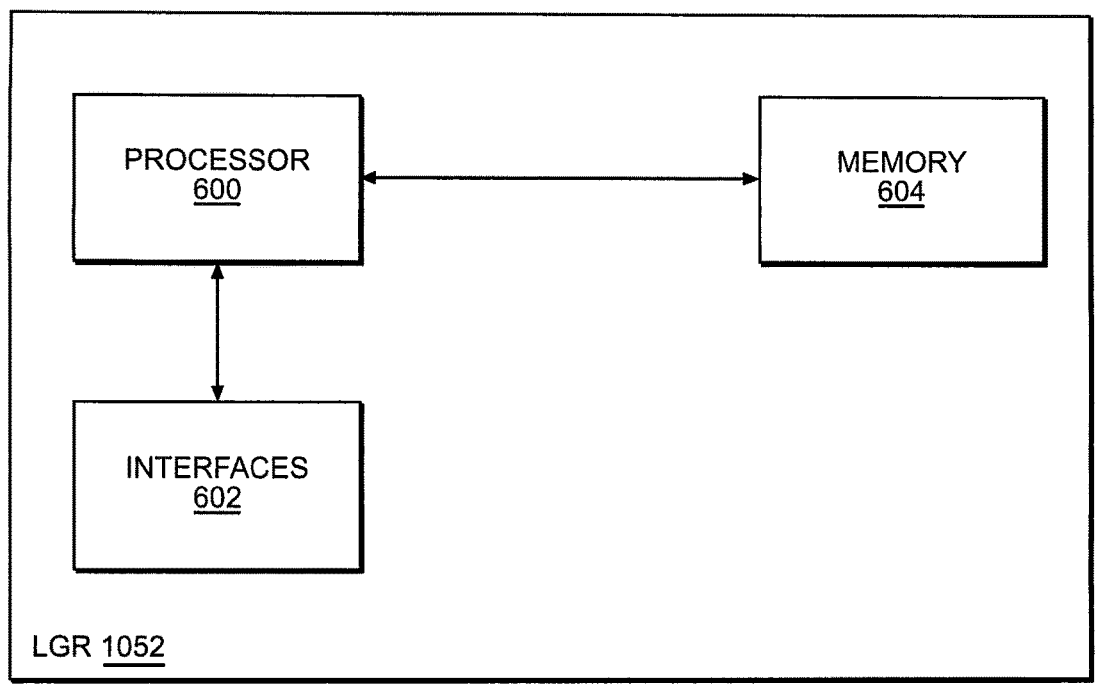
FIG. 6 is a block diagram illustrating example components of a network element according to an example embodiment.

FIG. 6 illustrates example components of a network element according to an example embodiment. For the purposes of description, the network element in FIG. 6 will be assumed to be the LGR 1052. However, the description of the components shown in FIG. 6 may also be applicable to other elements of example embodiments, such as WLAN GWs, WiFi APs, UEs, PGWs, SGWs, eNBs, small wireless cells, etc.

As shown, the LGR 1052 includes a processor 600, connected to a memory 604 and various interfaces 602. In some embodiments, the LGR 1052 may include many more components than those shown in FIG. 6. However, it is not necessary that all of these generally conventional components be shown in order to disclose the illustrative embodiment.

Memory 604 may be a computer readable storage medium that generally includes a random access memory (RAM), read only memory (ROM), and/or a permanent mass storage device, such as a disk drive. Memory 604 also stores an operating system and any other routines/modules/applications for providing the functionalities of the LGR 1052, including those discussed herein. These software components may also be loaded from a separate computer readable storage medium into memory 604 using a drive mechanism (not shown). Such separate computer readable storage medium may include a disc, tape, DVD/CD-ROM drive, memory card, or other like computer readable storage medium (not shown). In some embodiments, software components may be loaded into memory 604 via one of the various interfaces 602, rather than via a computer readable storage medium.

Processor 600 may be configured to carry out instructions of a computer program by performing the basic arithmetical, logical, and input/output operations of the system. Instructions may be provided to processor 600 by memory 604.

The various interfaces 602 may include computer hardware components that connect the LGR 1052 via a wired or wireless connection to the PGW 103, the SGW 101, WLAN GW 115, the WiFi AP 120, the eNB 1050, the UE 1, the application/proxy server 110, etc.

As will be understood, the interfaces 602 and programs stored in the memory 604 to set forth the special purpose functionalities of the network element will vary depending on the network element.

Although example embodiments are discussed in detail with regard to IP addresses, including source IP address, etc., example embodiments may utilize IP addresses and/or ports to achieve the functionality discussed herein. For example, the LGR 1052 may forward/route the WiFi uplink IP packets from the eNB 1050 to the WLAN (including, e.g., the WiFi AP 120 and the WLAN GW 115) by configuring the IP route based on the source IP port of the uplink IP packets, which is the source IP port of the WiFi interface 136 used by the application App(WiFi) at the UE 1, identified and determined to be part of the WLAN subnetwork.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A radio access network element comprising:
a local gateway and router device configured to route uplink IP packets from a base station to a network element of a wireless local area network (WLAN) by configuring an IP route for the uplink IP packets based on a source IP address of the uplink IP packets, wherein the source IP address is obtained from the WLAN,
the uplink IP packets originate from a user equipment application having the source IP address, and
the uplink IP packets have an indicator indicating that the uplink IP packets were received at the base station over a cellular link between the user equipment and the base station.

2. The radio access network element of claim 1, wherein the local gateway and router device is further configured to route the uplink IP packets to the network element of the WLAN over an IP tunnel between the local gateway and router device the network element of the WLAN.

3. The radio access network of claim 2, wherein the network element of the WLAN is a WLAN access point.

4. The radio access network element of claim 1, wherein the local gateway and router device is further configured to route the uplink IP packets to the network element of the WLAN over a generic routing encapsulation (GRE) tunnel between the local gateway and router device and the network element of the WLAN.

5. The radio access network element of claim 4, wherein the network element of the WLAN is a WLAN gateway.

6. The radio access network of claim 5, wherein the local gateway and router device is further configured to route the uplink IP packets to a network address translation (NAT) function at the WLAN gateway.

7. The radio access network of claim 1, wherein the local gateway and router device is further configured to establish an interface with the network element of the WLAN, the interface with the network element of the WLAN being one of an IP tunnel and a GRE tunnel between the local gateway and router device and the network element of the WLAN.

8. The radio access network of claim 1, wherein the uplink IP packets include at least one of uplink bearer IP traffic and Transport Control Protocol (TCP) acknowledgements originating from the user equipment application having the source IP address obtained from the WLAN.

* * * * *